Oct. 13, 1970 G. A. FRIESEN ET AL 3,534,161

TELEVISION COMMUNICATION SYSTEMS

Filed Jan. 6, 1967 7 Sheets-Sheet 1

T5005

X5001

X5012

Rm

INVENTORS.

GORDON A. FRIESEN

JAMES F. CULBERTSON

BY Jacobi & Davidson

ATTORNEYS.

Oct. 13, 1970 G. A. FRIESEN ET AL 3,534,161

TELEVISION COMMUNICATION SYSTEMS

Filed Jan. 6, 1967 7 Sheets-Sheet 2

INVENTORS.
GORDON A. FRIESEN
JAMES F. CULBERTSON
BY Jacobi & Davidson
ATTORNEYS.

INVENTORS.
GORDON A. FRIESEN
JAMES E CULBERTSON
BY Jacobi & Davidson
ATTORNEYS

INVENTORS.
GORDON A. FRIESEN
JAMES F. CULBERTSON

BY Jacobi & Davidson
ATTORNEYS.

INVENTORS.
GORDON A. FRIESEN
JAMES F. CULBERTSON

BY Jacobi & Davidson

ATTORNEYS.

INVENTORS.
GORDON A. FRIESEN
JAMES F. CULBERTSON
BY Jacobi & Davidson
ATTORNEYS.

INVENTORS.
GORDON A. FRIESEN
JAMES F. CULBERTSON

BY Jacobi & Davidson

ATTORNEYS.

United States Patent Office 3,534,161
Patented Oct. 13, 1970

3,534,161
TELEVISION COMMUNICATION SYSTEMS

Gordon A. Friesen, Potomac, and James F. Culbertson, Kensington, Md., assignors to Gordon A. Friesen International Inc., Washington, D.C., a corporation of the District of Columbia Continuation-in-part of application Ser. No. 522,729, Jan. 24, 1966. This application Jan. 6, 1967, Ser. No. 607,676
The portion of the term of the patent subsequent to July 22, 1985, has been disclaimed
Int. Cl. H04n 7/10, 7/18
U.S. Cl. 178—5.6 12 Claims

ABSTRACT OF THE DISCLOSURE

A communication system which utilizes at least in part available components of a television set and preferably a simple coaxial cable, for purposes of establishing information transfer between a main station and a remote location. It finds particular utility when utilized as a hospital communication system.

This application is a continuation-in-part of application Ser. No. 522,729 filed Jan. 24, 1966 and now Pat. No. 3,423,521 and entitled "Communication Systems."

This invention relates generally to communication systems and is particularly concerned with the provision of a communication system which can be easily installed and used to widespread advantage for communications between a central station or stations and a multiplicity of individual remote locations. The invention finds particular utility when utilized for hospital communications, and accordingly, the invention is considered herein in connection with such application, but it is to be understood that there are other purposes for which the system can be advantageously employed.

In present day hospitals, one normally finds some type of a "call button" or the like which is available to the patient in his room and also in the lavatory. Conventionally, these call buttons are linked with a call system that serves to energize a light outside of the particular room from which the patient calls and/or a light at a central floor nursing desk. Such call systems merely tell a nurse in attendance that her services are demanded, but no audible information is transmitted through the system between the patient and the nurse or other attendant. In some more modern installations, so-called "intercom" systems have been installed to overcome this rather obvious and severe limitation. These "intercom" systems permit the patient to talk with an attendant at a remote location just as, for example, persons at remote locations can exchange communications through an intercom system as used in an office and/or by way of the telephone. While the use of an audible transfer arrangement such as the more or less conventional "intercom system" afford certain advantages, there are certain disadvantages attendant thereto, and moreover, the systems are not adapted to easily handle special situations. For example, additional provision must be made for some means of transmitting monitoring information from a given patient to a central location if a given physiological characteristic of the patient is to be monitored such as heartbeat or the like. Further, with the "intercom" type systems, it is necessary to initially install at least a multi-conductor type cable linked with each patient and/or each patient's room, and this in itself renders the system somewhat complex and increases the installation costs beyond desirable limits. Also, the individual "intercom" units are complete in themselves and thus rather expensive.

There thus remains a need for a relatively simple and easily used communication system which permits a patient not only to "signal" an attendant at a remote location, but to also exchange information with the attendant, and if desired, which further permits the transmission of monitoring information to the central location. The primary object of the present invention is to satisfy this need.

In addition to satisfying such basic need, the invention has as a further object, the provision of such a communication system which is compatible with other equipment and easily connected thereto, so as to permit efficient information transfer to roving members of a nursing staff and other hospital facilities such as centralized medicine storage areas, centralized supply storage areas, and the like. In other words, it is an object hereof to provide a communication system which has essentially complete versatility so as to enable efficient information transfer between various locations and which further is relatively simply in operation, dependable in use, and comparatively inexpensive to install and maintain.

As known to those familiar with hospital operation, it has proved desirable to provide some means for entertaining a patient while he is confined in a hospital, and to this end, previous suggestions have been made with respect to the use of equipment for delivering music to each room. Even further, one finds that it is common to have one or more television sets in each room of a hospital so that a patient can himself select a given entertainment program to view.

This entertainment aspect should thus be satisfied, and accordingly, another object hereof is to provide a communication system conforming with the preceding objects (1) wherein a television set is provided in each room of a hospital at least, and preferably, an individual set is provided for each patient in each room so that a patient is permitted complete freedom in selecting a given program, and (2) wherein the system utilizes such television set as a base component or element of the system for establishing communication between a given patient and at least one central station so as to thereby eliminate component duplication and minimize cost.

Not only does the invention desirably facilitate actual message exchange between the patient and the attendant, and afford an entertainment source, but it further insures the desired flexibility in operation and utilizes but a simple dual conductor cable. To this end, it is an object hereof to provide such a communication system which is adapted to be controlled by the patient, for example, through the use of a conventional pressure switch located near or adjacent his bed, through the use of a conventional pressure switch located near or adjacent the lavatory, which further permits a nurse or doctor to call a central station from a nursing alcove in a particular room to transmit given information therefrom, to one or more desired ultimate locations, and which handles all electrical signals through a simple connection cable. Going one step further, it is an object to provide such a system which additionally is readily adapted to handle and transfer monitoring information (e.g., physiological information developed by suitable equipment asociated with a given patient).

In line with the foregoing, the invention provides for the use of a common cable adapted to carry power for a plurality of television sets and further adapted to simultaneously carry what can conveniently be called "coded" and information signals thereon. At present, television sets which operate from a 24-volt DC power supply are available on the commercial market, and such television sets are desirably used in systems according to the invention. Preferably, one such set is provided for each patient in each room. Further, an attachment, preferably in the form of a plug-in unit, is associated with each set. Then, each set and thus each bed is assigned a given code or code signal or set of code signals. The speaker of each television set, and an auxiliary jack, if physiological information is to be transmitted, are used for purposes of supplying information to the system from a patient and/or for initiating a message transfer by the patient.

For convenience in initial understanding, assume that a patient wishes to call a central floor station. According to the system provided hereby, he would operate a switch such as the normal pressure switch commonly found on hospital beds today. This would result in converting at least the audio portion of the television set from what might be deemed its "entertainment mode" of operation. The patient could then deliver the message to the central station merely by talking, with the speaker of the television set serving as the pick-up for the patient's message.

When the patient operated the switch in question, placing the television set in its transmission mode, a coded signal would be delivered to the central station thereby informing the central station of the incoming call. The central station would then receive the incoming call in sequence or according to pre-established priority, and an exchange of information would take place between the central station and the patient via the speaker. Similarly, when the central station wished to call a given patient, it would merely operate a given switch or selector mechanism so as to in turn automatically operate the television set associated with that patient whereby it was conditioned for the message exchange in the desired manner.

The simplified explanations presented immediately above serve to illustrate the manner in which a given patient can communicate with a central location. The invention, however, is not necessarily limited in this regard and, in fact, it is contemplated that a more extensive communication system will exist in a hospital in which the system is employed.

Preferably, in any such hospital, one administrative control center is located on each floor. This center would handle all administrative communications from the floor to other parts of the hospital and to the main switchboard through the use of telephones or other appropriate intercommunication systems. The master station or console of the above-described "patient call" system would be located at this center and, moreover, means would be provided there for two-way radio paging on the floor.

A team control center would also be located on each floor, with one such center preferably being provided for approximately twenty patients. The team control center would store narcotics, have minimal conference space, and be linked by telephone or other communication networks with the administrative control center and a supply processing and distribution center. Further, it could be linked with other key operational and/or administrative areas. Certain alarm or priority call information received over the basic patient's intercommunication system could desirably be channeled to the team control center.

Also, a supply processing and distribution center would preferably be located on the first level of the hospital to centralize receiving, processing, storing and issuing of all supplies for the entire hospital. Communications from each floor to the supply processing and distribution center could conveniently be achieved through the administrative control center either directly or indirectly from a member of the roving staff through the radio paging system, from a nursing alcove in a patient's room, from the team control center, and/or from a clean and soiled handling area on each floor. The clean and soiled handling area on each floor would receive clean supplies from the supply processing and distribution center and would be the source of centralized return of soiled supplies, waste, and the like. Communication from the clean and soiled handling area to each administrative control center, and to the supply and processing distribution center would be provided and, in turn, there would be communication to any remote location which was in information transfer connection with the administrative control center.

The aforesaid nursing alcove is preferably incorporated in each room and contains a hand set. Communications by the hand set can be made through the patient's communication system described in some detail and/or directly or indirectly to other key locations in the hospital.

Thus, with the centralization of material and supply handling areas and with appropriate communication links therebetween, an efficient overall administrative operation can be achieved, with the need of any patient in any given instance being conveniently handled from the basic communication link between the patient via his television set and the master console to which the television is coupled for information transfer through the coded signal technique.

All of these auxiliary centers or stations and their described functions are, in other words, made a convenient, efficient and practical reality with the basic patient's call system and satisfying the objects outlined in detail previously.

However, it is to be understood that there are certain important additional objects and operational factors of extreme significance with respect to the present invention. First, it is an object to provide a communication system which permits the use of a centralized administrative control center for a group of patient room sections, which administrative control center is so arranged as to facilitate patient communication by a single operator or more than one operator, depending on the communication traffic, and with the change-over being made through simple switching means. Additionally, an objective of the present invention is to provide a system which can operate with an audio exchange between patient and a centralized location and/or with audio and video communication exchange between respectively different locations. In this regard, the system contemplates the patient's visual receipt of the nurse or the like at the administrative control center simultaneous with the receipt of the audio information. Moreover, communication of a visual nature between an isolated patient and his family at a remote location is possible with a variation of the system provided hereby.

In connection with the more detailed aspects of system operation, further important objects of the invention include: (a) the provision of a common antenna receiving means for a plurality of patient sections in association with conveniently sized power supplies for each of such sections; (b) the provision of a system conforming with the preceding objects and including essentially means for changing channels to effect receipt of audio and video information, and means for permitting the patient to make a call and exchange audio information with an administrative control center; (c) the provision of a system conforming with (b) immediately above, wherein the means utilized by the patient to notify the administrative control center of his call and to exchange audio information therewith is also utilizable to permit an exchange of private information by hospital attendants such as a nurse from a privacy station such as a nursing alcove, without interfering with the patient's normal television operation; (d) the provision of such a system which can be effective with a frequency code and/or with a pulse code to yield the intended information transfer; and (e) the provision of such a system which, notwithstanding its versatility, can be economically installed and efficiently and easily operated without undue or complex special training of available hospital personnel.

The invention will be better understood, and objects and advantages other than those set forth above will become apparent, when consideration is given to the following detailed description. Such description makes reference to the annexed drawings presenting preferred and illustrative embodiments of the invention, and wherein.

Figure 11:
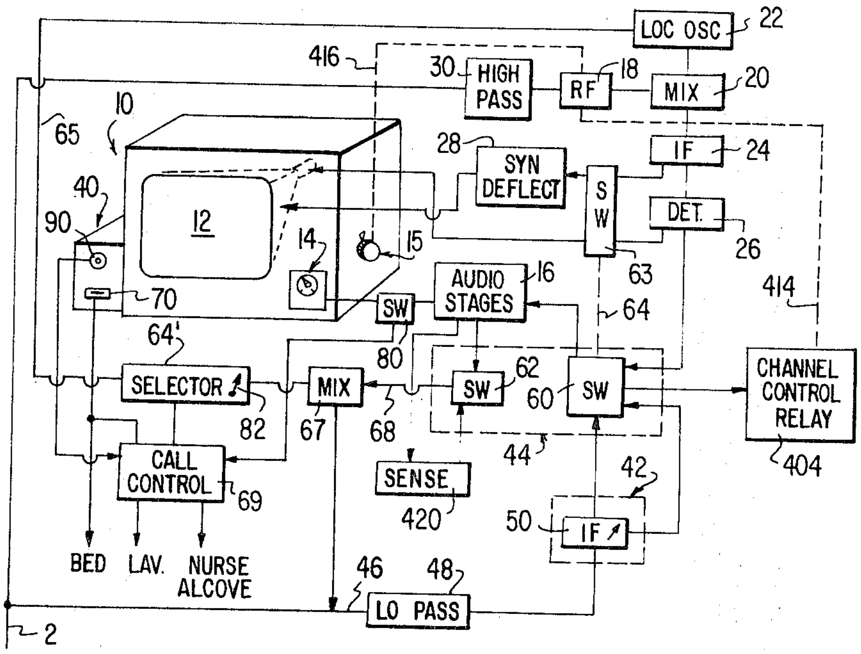
Figure 12:
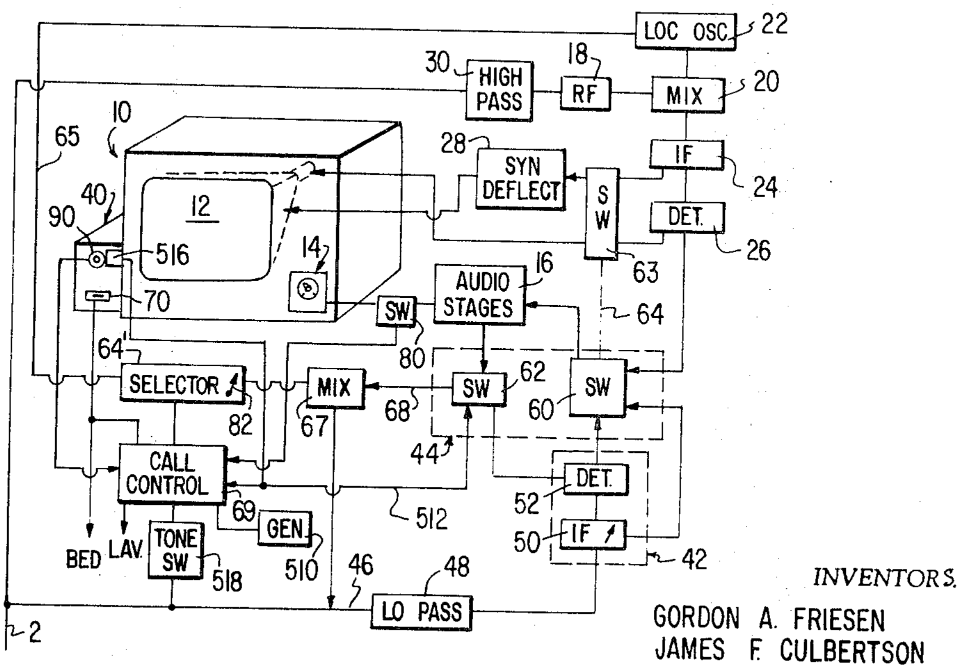
Figure 13:
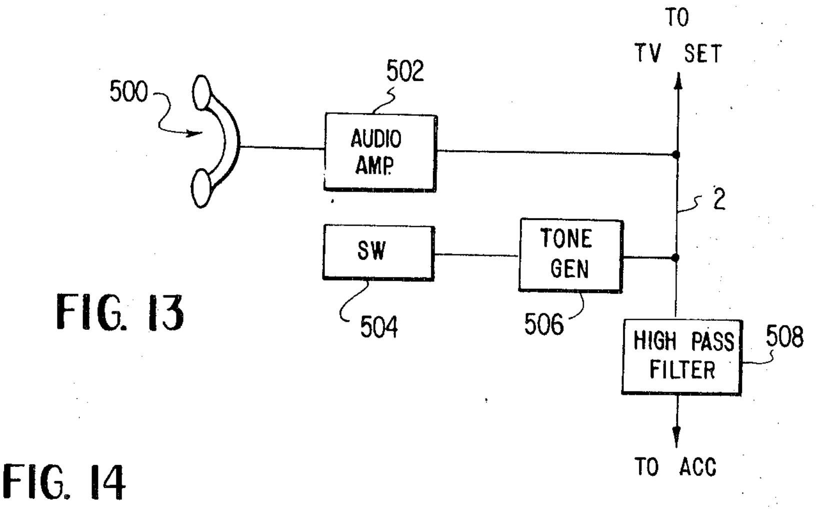
Figure 14:
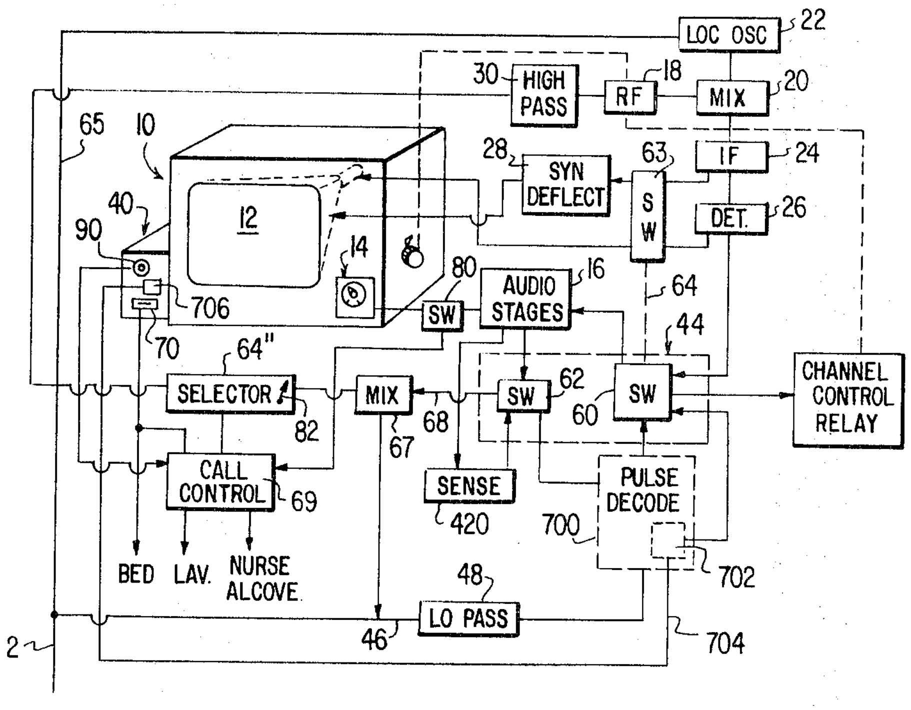
Figure 15:
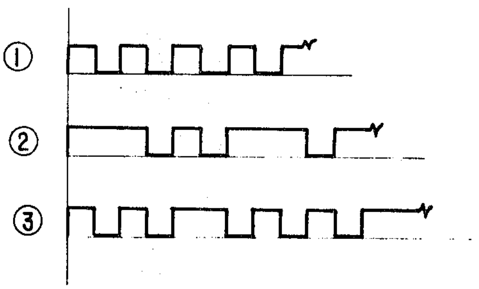

FIGS. 11, 12 and 14 are schematic block diagrams of receiving stations constructed in accordance with respectively additional modified embodiments hereof, FIG. 11 being directed to the use of a video channel for audio and video exchange, FIG. 12 being directed to an arrangement for permitting privacy information transfer and FIG. 14, being directed to an arrangement wherein a pulse code is used rather than a frequency code;

FIG. 13 is a fragmental schematic block diagram of the components utilized at a nursing alcove with the receiver station arrangement of FIG. 12; and FIG. 15 is a pulse diagram showing exemplary types of pulse chains which can be used for coding purposes.

Figure 1:
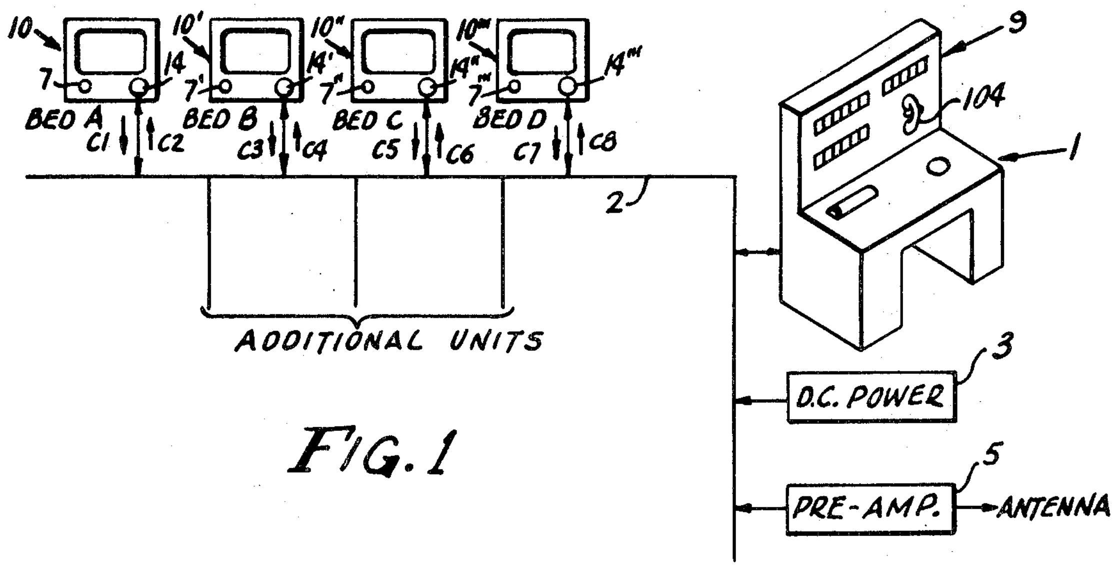
FIG. 1 is a schematic system diagram illustrating a basic communications arrangement consistent with the invention.

To facilitate an understanding of the basic aspects of the "patient call" system hereof, attention is initially directed to FIG. 1. In this figure, a cable 2 is shown running from a master console 1 at an administrative control center to connections with a plurality of television sets 10, 10', 10'', etc., each associated with a given patient's bed (i.e., bed A, bed B, bed C, etc.). For convenience, the systems of FIG. 1 can be deemed to have three basic elements, namely, a supply section, a plurality of remote stations, and a master station.

The supply section, consistent with this definition, includes the cable means 2 which itself comprises a coaxial cable, a twin lead cable, or other connecter means having a pair of conductive elements. A DC power supply 3 of any convenient and conventional design serves as a means for supplying DC power to the connection cable 2 and thus forms part of the supply section. Similarly, a preamplifier 5 serves to link a television antenna with the cable 2, thus as part of the supply section, providing means for delivering television signals to the cable means 2.

Each remote station includes a television set 10 which is operable with the DC power to present in one mode of operation both visual and audio information in response to receipt of the television signals. It will be noted that the cable means 2 carries thereon both the DC power signal and the television signals, thus minimizing installation and connecting complexities and costs by permitting a single simple cable to be run down a hall, for example, in much the same manner that AC lines are installed.

Each television set 10 has a speaker or audio transducer means 14, and further includes an audio signal handling network adapted to normally operate in one mode to deliver an audible signal through the speaker. Thus, in essence, the system as explained thus far includes a plurality of television sets receiving power and TV signals from a common cable and adapted to operate in the conventional manner. As explained below, however, each of the sets includes a special detector means for detecting the presence of a predetermined coded signal on the connection cable and producing a control output in response thereto. For example, the set 10 includes a detector means for detecting the presence of coded signal C2, whereas the set 10' includes a detector means for detecting the presence of coded signal C4 on the cable 2.

The detector means in each set, as also explained more fully below, operates a control means which converts the audio signal handling network from its normal entertainment mode of operation to a second mode of operation in which such network at least receives and audibly produces through the television speaker command information. Means are provided for receiving communication (voice) signals from the connection cable means and feeding the same to the audio handling network. In other words, on the same cable 2 which carries the power signal and the television signal, code signals and communication signals are carried, and each television set incorporates means for selectively handling these latter signals.

The master station or console 1 includes code signal generator means for producing any one of a plurality of predetermined code signals and delivering the same to the connection cable means as shown and explained in connection with FIG. 3. It further includes a hand set or second audio transducer means 104 and means for supplying signals generated in the second audio transducer means to the connection cable.

Therefore, for example, if an attendant at the master station 1 wishes to speak with a patient in Bed C, such attendant operates the console whereby a coded signal C6 is fed to the cable 2 and this coded signal operates the television set 10'' so that the patient and the attendant can exchange information through the television set at the patient's room and the hand set at the master console respectively. Each television set is only responsive to a certain coded signal, and the existence of the signal C6 on the cable means 2 does not interfere with the operation of any set except that at Bed C.

The master station preferably further includes means for receiving coded signals from the line indicative of reach remote station and means for separating the same and indicating the coded signal so received at least visually on display panel 9. Also, each remote station further includes signal developing means for delivering to the line at least one code signal indicative of that remote station. Again referring to Bed C, the set 10'' there located has a means such as a call button 7'' which can be depressed to render this set in condition for communication with the master console 1. When depressed, the button 7'' causes a code signal C5, for example, to be fed to the line 2, and the master console includes means for receiving this signal and indicating to the attendant that "Bed C is calling." Thereupon, communication is again established via the television set with the master console 1, this communication not interfering with the operation of any other set due to the selectivity of the system.

Having now considered the basic type of operation of the system of the invention, attention is directed to one illustrative embodiment thereof in which the code is determind by selection of frequencies. The same general type of operation can be achieved with a pulse code, or with other types of coded signals and accordingly, it is to be understood that the specific embodiment described in detail below is presented for illustrative purposes.

Figure 2:
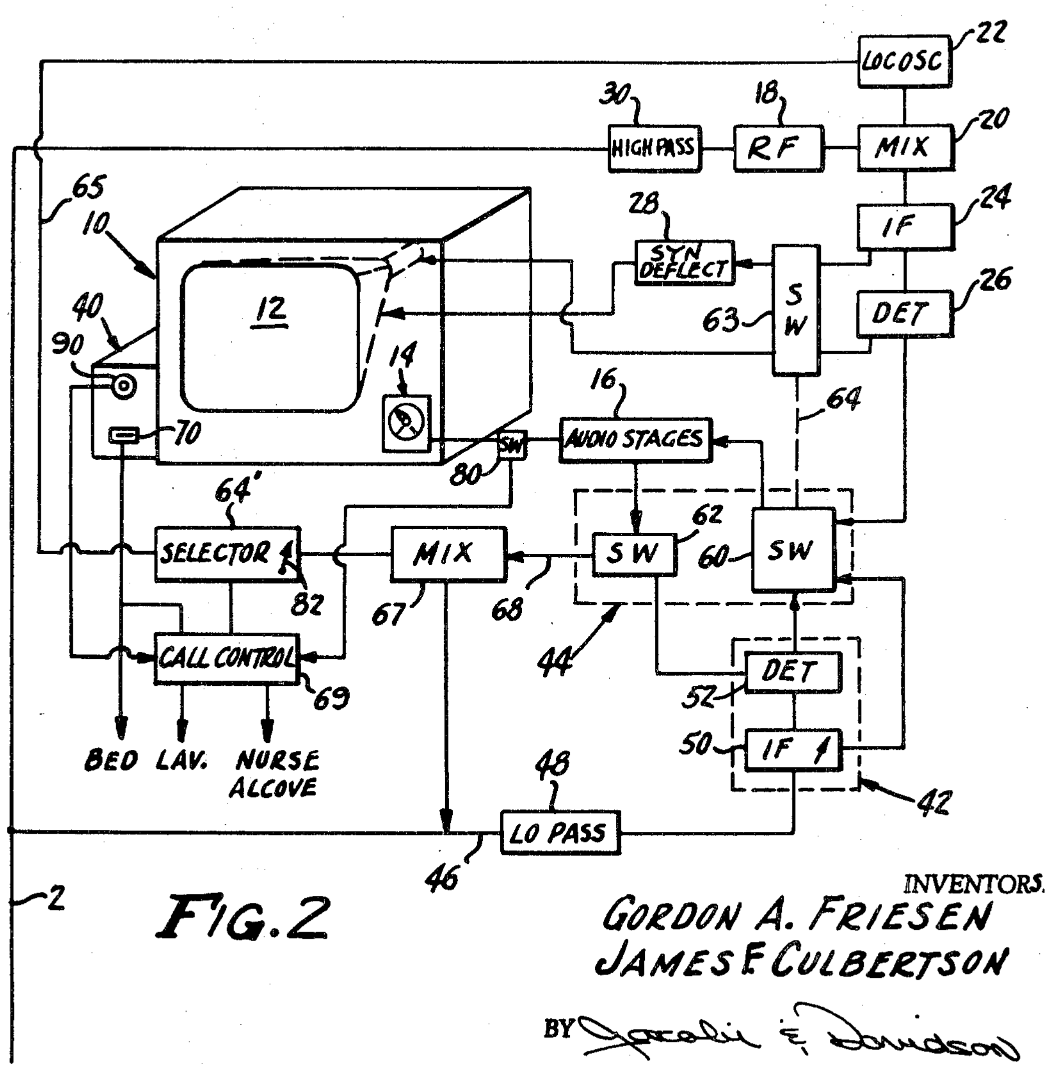
FIG. 2 is a schematic block diagram of a receiving station constructed in accordance with a basic illustrative embodiment described herein.

The receiving station for such illustrative embodiment, as presented in FIG. 2, incorporates the television set 10 designed to operate in the manner explained above. More particularly, the television set 10 is operable with DC power and television signals supplied on cable means 2, to present in a first mode of operation both visual and audio information through the picture tube 12 and speaker 14, with the speaker 14 serving as the audio transducer means.

As customary, an audio signal handling network or audio stages 16 normally operate to deliver an audible signal to the speaker 14. Further, the television set, as also conventional, includes RF stages 18, a mixer 20, a local oscillator 22, intermediate frequency stages 24, a detector means 26, and synchronization and deflector networks 28. The power received over the cable is fed to the circuits in the normal manner. The television signal as fed over the cable means 2 initially encounters a high pass filter 30 and then is transferred to the RF stages 18. Here, the particular channel desired is selected, and other conventional operations are performed. The output from the RF stages feeds to the mixer 20 where such output is mixed or heterodyned with a signal from the local oscillator 22 so as to produce a modulated intermediate frequency signal which is in turn transferred to the detector 26 and the synchronization and deflector networks 28. The outputs of the synchronization and deflector networks 28 are fed to the so-called "plates" and/or "coils" of the tubes to control the picture itself whereas the output from the detector 26 is fed to the tube gun control arrangement. Further, as conventional, the output from the detector 26 is fed to the audio stages so that the audio signals ultimately appear at the speaker 14.

The basic television set networks and components have only been described briefly above because their operation is well known and further description thereof is accordingly unnecessary to a proper understanding of the invention. It will be noted, however, that insofar as the basic television set is concerned, and the basic feed-in arrangement is concerned, the only modification that has been made is that the signals from the detector 26 passing to the audio stages go through a switch 60 to be later described. For practical purposes, during normal operation, this switch merely serves to connect the audio output of the detector 26 with the audio stages for proper transfer therefrom to the speaker 14.

In addition to the conventional television circuit components, the television set 10, when modified consistent herewith, further has associated therewith another series of components. This other series of components, while very simple in nature and design, are preferably housed either within the cabinet of the television set 10 or in an auxiliary unit 40 which can be readily attached thereto as for example by a plug-in connection. The auxiliary series of components includes an incoming signal decoder 42, or more particularly, a first detector means for detecting the presence of a predetermined coded signal on the cable means and producing a first control output in response thereto, and an audio programming and changeover means 44, or more particularly, a first control means responsive to the first control output for converting the audio signal handling network from its first mode of operation to a second mode of operation in which the audio signal handling network receives and audibly produces patient communication information through the audio transducer means or speaker 14.

To better understand the preceding, it is to be noted that a connection 46 is made between the cable means 2 and the incoming signal decoder 42. This connection feeds through a lowpass filter 48 which does not pass the television signals and instead only transfers the code signals to an intermediate frequency stage 50. The code signals, as described more fully below, can for example, comprise modulated carriers. Thus, a carrier of a frequency $fc2$ corresponds to the preselected code for the particular station where the television set 10 is located (i.e., Bed A of FIG. 1). By way of example, let it be assumed that 20 stations are to be monitored or connected with a single nursing central station. To each of these patient stations, a single carrier frequency would be assigned, and the frequencies would be separated by bandwidths so that they could be easily separated with comparatively inexpensive filters.

Thus, over the cable means 2, there would feed the DC power signal, the conventional television signal, and when the system was in operation, at least one code signal, or in the example given, a signal of a frequency $fc2$. The signal of the frequency $fc2$ would not pass to the video network since it would not pass through the high pass filter 30, but it would pass through the low pass filter 48 and to the IF stage 50. The IF stage 50 while of conventional design, is selective to frequency $fc2$ so it only produces a usable output when the frequency $fc2$ is fed thereto as distinct from any other frequency which may appear on cable 2. If the IF stage produces a significant output, i.e., if the frequency $fc2$ appears on the cable 2, then the output from the IF stage passes to the audio program and changeover unit 44. This unit includes, by way of example, the switch 60 as well as a switch 62. When the frequency $fc2$ appears on the cable means 2, and in turn the IF stage 50 produces an output, the switch 60 disconnects the audio stages 16 from the detector 26 while at the same time connecting the audio stages 16 with the detector 52. Conversely, when $fc2$ no longer appears on cable means 2, switch 60 automatically reconnects the audio stages 16 with detector 26 restoring set 10 to its normal operation.

The frequency $fc2$ has been described above primarily as a code signal. However, this signal, consistent with the illustrated embodiment and as indicated, actually comprises a carrier which can have an audio or voice signal modulated thereon. Accordingly, the IF stage 50 feeds to the detector 52 which detects the audio modulations, if any, on the carrier $fc2$ and feeds the same through the switch 60 to the audio stages 16 and in turn to the speaker 14.

By using the television set which was made available to the patient, and by using a common cable connection, power was supplied to the television set, the video signal was supplied to the television set, and information from a master station, as placed on the cable means 2 was also fed to the television set. This latter information, or in the example given, the modulated carrier $fc2$, served to automatically travel to the patient through the television set, the automation being achieved by merely disconnecing the audio stages from the audio portion of the television signal and connecting the audio stages to the incoming signal decoder 42. In essence, a simple filter 50, a simple detector 52 and a simple switch 60 are utilized in this illustrated embodiment to automatically interrupt any program which the patient may be watching and deliver to him a communication from the remote location. The manner in which the signal from the remote location is developed will be explained below.

One further modification which has been made to the television set is the inclusion in the network thereof of a switch 63. This switch 63 serves to essentially cut off the picture tube if the patient does not desire to watch television. At the same time, the switch 63 is linked, as for example, by the mechanical link 64, with the switch 60 so that the remaining portions of the television set remain in operation at all times, and the audio output from the normal television signal only is shut off when the picture tube is shut off. The patient can thus turn off his set without actually disconnecting the same from the cable means 2. Accordingly, with the generation of a coded signal at the master station in the manner described below, a person at such station can at all times deliver a signal to a particular patient through the system in the same manner as described above.

Now, having understood how a signal can be received by a particular patient, let us examine how a patient can send a particular signal. In this connection, it will be first noted that the local oscillator 22 is connected with a selector 64' by a lead 65. The local oscillator is that which exists in the television set itself under normal conditions, whereas the selector is an added component. The selector 64' feeds to a mixer 67, and the mixer 67 receives a further input on the line 68. This further input travels from the audio stages 16 through a switch 62 to the mixer 67. The selector 64' essentially is a frequency selector in the illustrated embodiment. More particularly, it operates to provide one of a number of signals available at the local oscillator 22 and either filters, divides, multiplies or converts the same so that a distinctive coded return signal is obtained, which, consistent with the preceding discussion, would be $fc1$.

If the patient wishes to make a call, he can, for example, depress the button 70 on the auxiliary unit 40 provided to house the auxiliary components, and this will in turn activate a call control unit 69 to be described below. The selector 64' will then produce an output $fc1$ which is fed to the mixer 67, and which is thereafter fed to the connection 46 and in turn to the cable means 2. This signal $fc1$, as it exists in the cable means 2, is received at the master station.

Assuming that the master station anwsers the call, in the manner indicated, then upon so answering, the frequency $fc2$ referred to above would, as explained below, appear on the cable means 2 just as if the master station had initiated the call and accordingly, there would be an output from the intermediate frequency stage 50 which operates the switch 60 so that the audio stages 16 are no longer connected with the normal television circuit. If no voice signal is modulated on the frequency $fc2$ at the master station and/or upon termination of an answering voice signal, there is no output from the detector 52. The switch 62 is responsive to such output, and in the absence thereof, connects the audio stages 16 via the line 68 with the mixer 67. Thus, when the patient speaks, the speaker 14 serving as the transducer means, produces an audio signal which is amplified in the audio stages, fed through the switch 62 and to the mixer 67 whereupon it is modulated on the frequency $fc1$ determined by the selector, and the frequency $fc1$ as so modulated, is fed onto the cable means 2.

It has been assumed above that the patient initiated a call and/or received a call while in his room and/or where no privacy was desired. However, in certain instances, the patient may be in the lavatory or, alternatively, some privacy may be desired for communication between a nurse and the master station. Thus, the call control unit 69 is incorporated. In the normal instance, this call control network merely connects a pressure switch on the bed (not shown) and/or the pressure switch 70 to the selector 64' so that the frequency $fc1$ is fed to the mixer 67. However, if the patient happens, for example, to be in the lavatory, and if he pushes a pressure switch there, then the call control serves the same function, but additionally, it activates a switch 80 so that the output from the audio stages and/or the input thereto depending upon whether a signal is being sent or received is directed to the lavatory where an auxiliary speaker (not shown) is provided, if desired. Again, by way of example, if a hand set, such as a telephone hand set is included in a nursing alcove, as may be desired in some instances, then when the hand set is removed from the hook, the hand set feeds to the call control 69 which connects the hand set with the audio stages 16. Alternatively, in order to avoid any interference with television set normal entertainment mode operation, a simplified signal generating arrangement can be connected with this hand set so that audio operation of the television set is not interrupted during a call from the nursing alcove.

The selector 64' can, for example, be a conventional frequency divider, frequency multiplier, or even selective filter network, and similarly, the call control unit 69 need merely comprise a conventional switching circuit connected to function in the manner described. These components, like other components, including for example, switches 60 and 62, are known to those of ordinary skill in the art and thus primary consideration is given to the involved function or operation thereof, it being understood that the invention resides in the combination of components as interconnected.

While in normal operation, the system described above would afford substantial advantage over present day hospital intercommunication systems between patient and a remote location, there are certain auxiliary features of the invention which should here be emphasized before discussing the master station itself. First, the selector 64' is preferably adjustable so that by operation of a control knob, such as a control knob 82, a nurse or other attendant can preset the selector 64' such that the output therefrom is not only frequency $fc1$, but instead, for example, is frequency $fe1$. Frequency $fe1$ can be conveniently termed an "emergency" frequency. Thus, by merely turning a knob and adjusting a conventional frequency selector, the nurse can determine whether the particular patient at the station of FIG. 2 (i.e., Bed A of FIG. 1) receives routine treatment in making calls or is to be given emergency status. Even further, the frequency $fe1$ or some other distinctive frequency could be used so that the signals fed over the cable means 2 are indicative of a particular condition. In this connection, assume that a heartbeat monitoring device is operating with a given patient, and that this monitoring device is to have its alarm signals fed to a remote location. In this instance, the output of the monitoring device would be coupled as by a jack connection 90 on the auxiliary unit 40, and the output would be modulated on frequency $fe1$, with frequency $fe1$ then being fed over the cable means 2 to deliver an alarm to the master station, whereupon an attendant can give that patient the necessary attention and/or reset the monitoring device.

The system of FIG. 2 has thus been shown to be capable of (1) automatically converting itself from an entertainment mode of operation to a patient communication mode of operation in response to a coded signal $fc2$ on cable means 2; (2) placing a "routine handling" coded signal $fc1$ on the cable means; (3) placing an "emergency handling" coded signal $fe1$ on the line; and (4) modulating signals $fc1$ or $fe1$ with either voice or other information. The additional components required to achieve these results are simple and the available television set networks have been used to a reasonable extent. Still, it will be appreciated that, for example, the detector 52, IF stage 50, and mixer 67 could be eliminated and the detector 26, IF stage 24 with simple modification as to selectivity and mixer 20 used for dual purposes (communication and entertainment) with switching means being provided to effect the necessary connections for alternate modes of operation. The technique explained would be basically the same, with the choice of dual functioning components depending upon relative cost and design factors.

Regardless of form, each receiving station as associated with a patient, operates in essentially three modes, namely, a normal entertainment mode where the television set performs in its usual manner, a sending and/or receiving mode where the arrangement serves to transmit information from the patient to a central station and/or receive information from the central station with the television audio output cut off, and a third mode wherein for practical purposes the television set is dormant, but for essential purposes the set is ready for communication between the patient and the central station at any instant. The television set itself, as modified, is, however, the basic instrument which handles all of the information transfer and furthermore, the cable 2 is the single means by which the information is carried from place to place.

Figure 3:
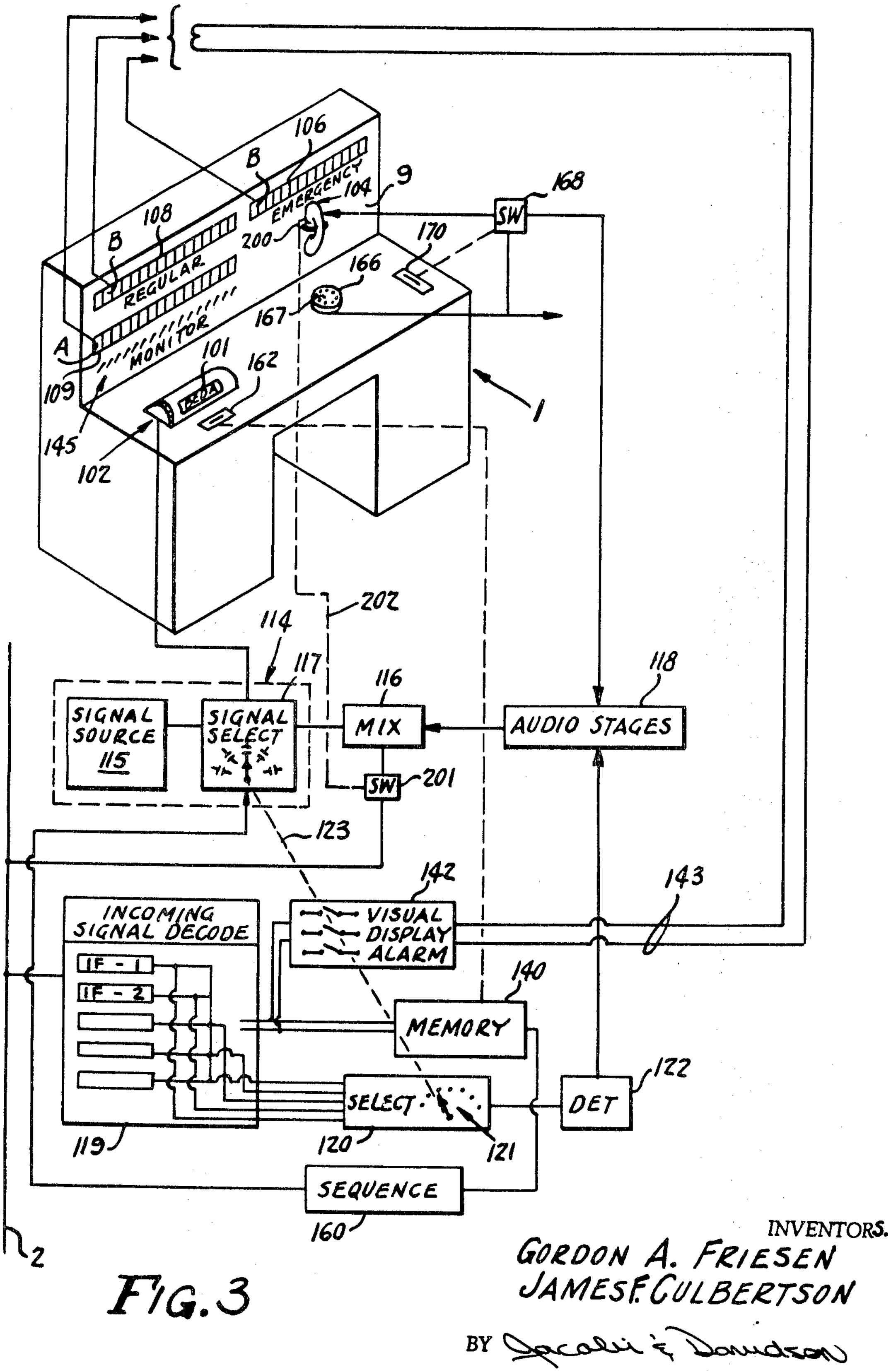
FIG. 3 is a schematic block diagram of a master station constructed in accordance with a basic illustrative embodiment.

Turning now to the master station, attention is directed first to FIG. 3. The control console 1 at the master station has a selector switch 102, a hand set 104 and a plurality of light panels 106, 108 and 109 on the display board 9. The master console 1, as indicated, operates in accordance with signals received and/or so as to selectively be in communication with a given remote station. To understand this operation, let us assume initially that a patient provided with the arrangement of FIG. 2 was to be called from the master station. To this end, the operator would rotate the selector switch 102 so that the particular patient's name and/or room number and/or bed position (e.g., Bed A) appeared in the selector window 101. This rotation would in turn cause the code means 114 to produce a given code signal. Consistent with the preceding example where coding is achieved by frequency selection, the code means 114 would produce an output frequency *fc*2. This frequency *fc*2 would feed from the code means 114, which can take the form of a conventional selectively operable frequency generator (e.g., oscillator 115) controlled by a selective condenser array 117) to a mixer 116, and from the mixer 116 to the cable means 2. This would result in the selected patient's television set having its audio portions set for reception of information from the master station. Now, if the operator further removed the hand set 104 and spoke thereinto, the voice signal would travel from the hand set 104 to the audio stage 118 where it would be amplified and fed to the mixer 116. The code carrier *fc*2 would thus have modulated thereon a voice signal from the master station, and the carrier *fc*2 with its modulation would pass to the selected patient's room with the selected patient receiving the information in the manner described above.

By using a simple selector switch device, an adjustable frequency generator responsive to such switch, a hand set, an audio amplifier and a mixer, connected as shown in FIG. 3, the master station is thus able to selectively deliver to cable 2 the particular modulated carrier—e.g., carrier *fc*2 modulated with the voice signal from the hand set. This establishes the necessary conditions for delivery of the outgoing signal to cable means 2 and in turn, with the already described apparatus, delivers the desired information to the patent, automatically interrupting the audio portion of any program the patient may be watching. Yet, this is but one phase of the overall communication which may be desired, and thus the master console further includes receiving networks responsive to the signals which can be placed on cable 2 by the remote patient stations.

For receiving purposes, in the illustrated embodiment the cable means 2 is connected with an incoming signal decoder 119. This incoming signal decoder, as explained below, separates or distinguishes between received signals and passes the same to other networks, including the incoming selector 120. The incoming signal selector 120 comprises, for example, a multi-position switch 121 linked to the signal selector 117, as again for example, by mechanical link 123. Thus, at the same time that the switch 102 is rotated to establish the particular outgoing carrier *fc*2 for the selected patient, it would similarly operate the incoming frequency selector 120 so that the selector 120 only passes therefrom a frequency corresponding to that emanating from the particular station called—i.e., according to the example, the frequency *fc*1 as separated by incoming signal decoder 119. The selector 120 passes the frequency *fc*1 to detector 122. and detector 122 feeds its output to the audio stages 118 which in turn feed the audio signal as separated from its carrier *fc*1 to the hand set 104. Thus, in esence, at the master station, by operation of the switch 102, the nurse or other attendant has selected a given station with which it wants to communicate and it has adjusted the selector 120 of the console so that the hand set of the console is receptive only to voice communications from that station. Accordingly, a two-way conversation can be carried on without interference from other signals on cable 2.

With respect to patient selection, it should here be noted that the system includes what may be deemed a "hang-up" or disconnect switching means. More particularly, a switch 200 is preferably associated with hand set 104 and a further switch 201 is connected in the output line from mixer 116. Switch 200 and switch 201 are linked together by any suitable electrical, or even mechanical connection, schematically illustrated by dash line 202, so that no output passes from mixer 116 to cable means 2 when the hand set engages switch 200. This is desirable to avoid an attendant's interrupting any patient's TV audio output during operation of selector switch 102, which may otherwise occur during selection.

In the illustrated embodiment, the incoming signal decoder 119 makes the selective return conversation operation possible since it includes a plurality of IF stages, each adapted to pass but a single carrier frequency which may appear on cable means 2. Thus, stage IF–1 of the incoming signal decoder only passes carrier *fc*1, whereas stage IF–2 passes only carrier *fc*3, and the remaining IF stages are similarly singularly passive to selective carriers placed on cable means 2 at remote locations. The selector 120 thus serves to selectively link a given IF stage of the incoming signal decoder with the detector 122, whereby the detector 122 of conventional design and operating in conventional manner separates the modulation from that particular carrier fed to it and delivers the modulation to the audio stages 118 for amplification.

If only the master station was to make calls, the preceding described system alone would be satisfactory, but as indicated, it is desired to have patients initiate calls, and for practical purposes, more than one call at a time may be received at the console or master station, and/or an emergency call may come to the master console which is to receive preference. Accordingly, the signals on cable 2 feed through the incoming signal decoder 119 not only to selector 120, but also to a memory system 140 and a visual display and alarm means 142.

The memory system 140 serves to store information on incoming calls for further use, whereas the visual display and alarm means serves to control the indicator panel 9 of console 1. For explanatory purposes with respect to the operation of these units, let us again assume that a patient with the system of FIG. 2 is in direct communication with the master console of FIG. 3. Let us further assume that this patient has a receiving code signal *fc*2, i.e., the frequency *fc*2 as produced at the master station is intended to reach this station, and a sending code signal *fc*1, i.e., a signal produced by the patient's unit at this given location has a frequency *fc*1. The operation during a communication for this assumption has been described above.

However, going one step further, assume that there is another patient in another location who wishes to communicate with the master station 1. This other patient, for illustrative purposes, will be assumed to have an identifying receiving signal *fc*4 and an identifying sending signal *fc*3. When this patient sends his signal *fc*3, such signal is received at the incoming signal decoder 119. The output from the incoming signal decoder 119 as fed to the visual display and alarm unit 142 results in causing a light, for example, the light B on the "regular indicator" 108 to be energized. Further, this signal is recorded in the memory 140. If the call is a regular call, then the attendant would merely note that the call has come in and would answer the same in turn. However, if the patient was an emergency patient so that the frequency was, for example, *fe*3, an emergency frequency from that patient, then the emergency light B on the emergency indicator 116 would be energized. The attendant could, therefore, immediately disconnect himself from the patient with whom he was formerly talking and connect the system with the patient B identified by his code carrier *fe*3. This would only require returning hand set 104 to the "hung-up" position and turning the selector control 102 to the prescribed bed, whereby through frequencies *fe*3 and *fc*4, the system would operate in exactly the same manner as prescribed previously.

The incoming signal decoder 119 would, for these purposes, include a sufficient number of IF stages to separate all possible code signals which may be received from patients via cable 2. The visual display alarm unit 142 could, in turn, comprise a conventional switching matrix with each switch being operative upon receipt of an output from its associated IF stage in decoder 119, to close a circuit to the proper lamp, the unit 142 being linked to the lamps via multiconductor cable 143 as indicated by FIG. 3.

In addition to "regular" and "emergency" calls, there are certain instances where it is desired to monitor a given patient from the master station. For this purpose, the AC electrical output of the monitoring device can be connected with the communication system by a simple jack or the like as explained in connection with FIG. 2. Assuming the monitoring device is connected in the system, then an alarm from the monitor should be transmitted to the central station. For this purpose, a series of switches 145 can, for example, be provided which serve to transfer the connection of the visual display and alarm unit 142 from the emergency lamp bank 106 or regular lamp bank 108 to the monitor lamp bank 109.

Referring again to the example used above, if the patient in Bed A was being monitored and the output from the monitor device was to be fed to the central station, then the switch for monitor lamp A would be operated so that the code signal received from that patient, whether it be *fc*1 or *fe*1, would cause the monitoring indicator lamp A for that patient to be energized. An audible alarm could in conventional manner be connected with the monitoring lamp so as to warn an attendant at the master station of the situation. Similarly, while lamps alone have been discussed above as indicators, energization of any lamp could be associated with an audible signal in conventional manner, if desired, and moreover, whenever a patient initiated a call, a light can be energized outside his room, also in conventional manner.

Since the system hereof responds to coded signals, it will be understood that a monitoring device can be associated, if desired, with a particular code frequency, and that the monitoring device can carry a suitable attachment for delivering the characteristic code frequency to the cable means 2, and/or each set in each patient's room can have an independent connection specifically adapted to handle monitoring information and feed the same to the cable means 2 independent of any communication operations. With separate frequencies, the use of the switches 145 would be eliminated and the monitoring display would be merely controlled independently from the visual display and alarm unit 142. This would eliminate any possible human error by inadvertent switching of the monitoring display. The basic system would remain the same, however, and these various alternatives regarding monitoring are discussed for two reasons primarily, namely, first to demonstrate the versatility of the system, and secondly, for purposes of completeness.

While, by a system of lights, an attendant at the master console station is told what calls are coming in, whether or not the calls are regular or emergency, and the like, there may well be instances where automated operation is desired. Therefore, the memory device 140, also of conventional design, is incorporated. The memory device records coded signals are received through incoming signal decoder 119 in the order of receipt—i.e., with one signal being recorded at a time. The memory device can well comprise a computer system programmed to sequentially store coded signals not only in the order received but also as to whether or not the signals are "regular calls" or "emergency calls." Further, the program would provide for cell feed in a prescribed order to a sequencing device 160 which automatically operates patient selector switch 102 in accordance with the stored signal delivered from the memory. Thus, if desired, by providing a conventional computer memory means and a sequencing device, an attendant can have automated patient answering. The basic operation for communication purposes would remain the same, the primary difference in this instance residing in the fact that the attendant activates the memory by switch 162, thus substituting automatic control of selector switch 102 for manual control thereof. Again, the versatility of the system becomes apparent from this modification.

It is to be noted that the system as described above, has primarily been described in connection with only one or two patients and one master station. It will be readily appreciated, however, that the system is readily adapted for application to a multiplicity of patient stations. Further, while frequency codes have been used, and in particular, intermediate frequencies used as carriers, other codes could be as easily used such as digital codes, pulse codes, or the like, and if frequency codes are used, these can be widely varied. The components incorporated would, in each instance, respond to a coded signal so as to control the communication operations in the same basic manner as explained in connection with FIG. 1.

In earlier potrions of this specification, mention was made of the ability of the system to provide communication efficiently with various hospital locations. In this regard, it is to be noted that the console 1 includes a conventional telephone dial arrangement 166 which is normally linked with the hand set 104 in the conventional manner whereby the hand set 104, with the dial 167 can be used in the same manner as a normal telephone. The switch 168, as actuated by the control 170, serves to permit an attendant to use the hand set for patient calls in the manner discussed above or for normal calls to other parts of the hospital or outside. Furthermore, if, for example, information regarding the monitoring of a praticular patient is to be transmitted to another location, the console 1 can include taps on the various IF stages of the incoming signal decoder 119 which are linked with jacks, or the like, on the console itself. In turn, a transmission line from the console to some other location could be provided so that by the use of such jacks, the monitoring information received at the incoming signal decoder could be transferred to the remote master monitoring station. This is achieved, for example, by using an arrangement similar to a telephone switchboard.

Figure 4:
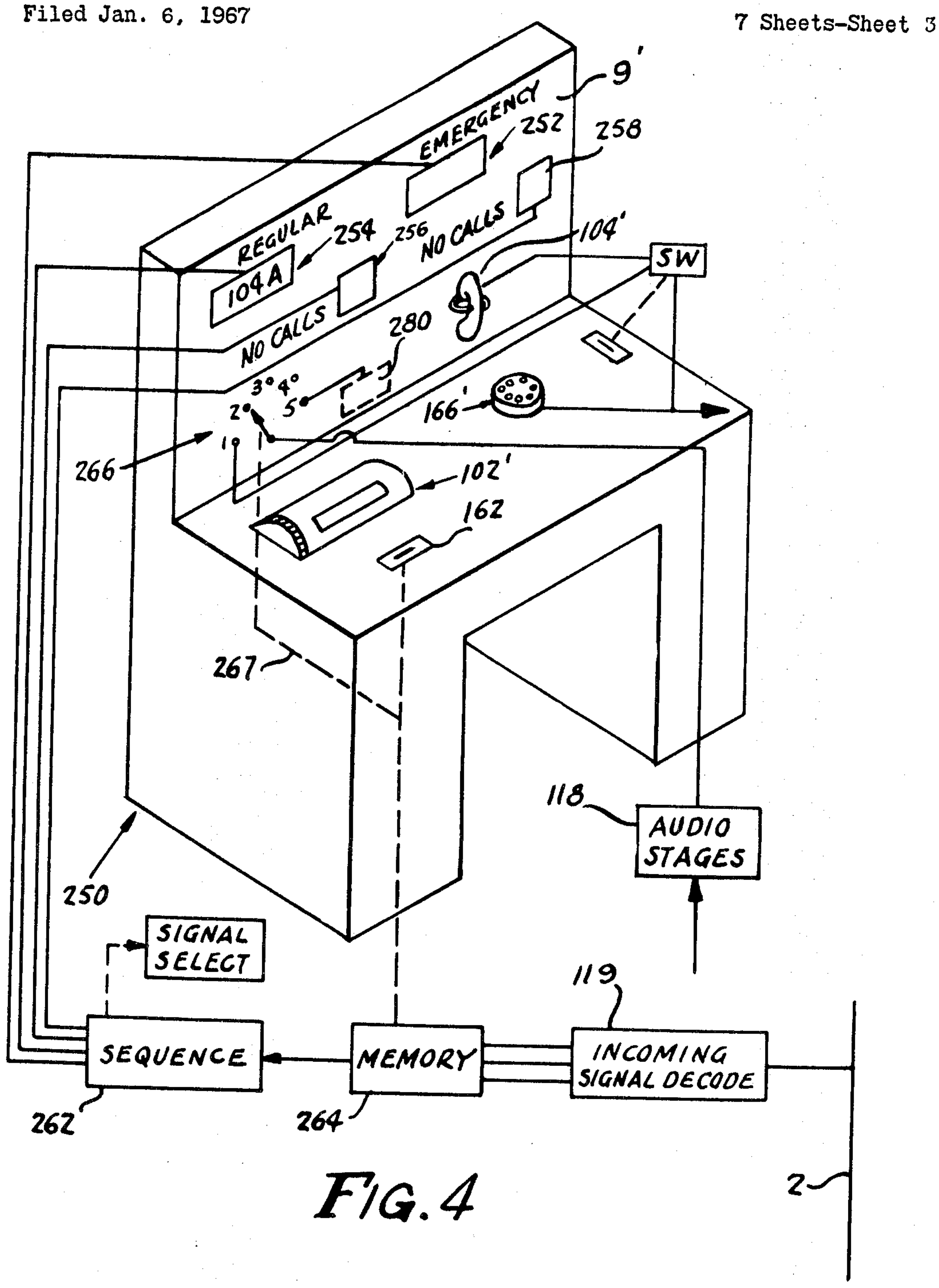
FIG. 4 is a fragmental schematic diagram of an alternate master station constructed in accordance with a further illustrative embodiment hereof.

In FIG. 4, an alternate and preferred form of master console unit is shown. This unit 250 includes a hand set 104', a dial arrangement 166' and a selector switch 102'. Moreover, it incorporates the same basic type of electronic network as the master console unit of FIG. 3. In this instance, however, the display panel 9' has four display areas 252, 254, 256 and 260 thereon, as opposed to the lamp bank areas 106, 108 and 109 of the FIG. 3 console. Display areas 252 and 254 are designed to present a given patient designation such as, for example, "104A," meaning that patient in Bed "A" in room 104 is calling. Area 254 is the regular call display, whereas area 252 is an emergency call display. The areas 256 and 258 present the number of calls of each type which are "backed up" or awaiting answer.

Each display area would thus have, again, for example, a multiposition display wheel, or the like, adapted to be selectively rotated to present given information. These wheels or devices are controlled by a sequencing device 262 which in turn receives sequencing information from a memory device 264. The memory device and sequencer would be operated and programmed as described for memory device 140 and sequencer 160, and according to conventional techniques so as to selectively receive calls over the cable means 2 in prescribed order and then store the called information to permit an attendant to answer the calls in desired order and according to time of reciept.

Another modification incorporated in the system of FIG. 4 involves the use of a multiposition control switch 266. When this switch was set in position 1, for example, the hand set 104 would be linked with the audio stages 118 through switch 266. However, when this switch was set in position 2, the audio stages 118 would be linked with a switchboard, for example, located at a main communications center in the hospital. Further, operating switch 266 to position 2 would automatically connect the memory device as by a mechanical or electrical link (schematically indicated as 267) for automatic call sequencing in the manner indicated above. Thus, at night, for example, the switch could be set in position 2, and in this instance, all calls would go to a main switchboard and the switchboard could talk directly with the patient, the answering frequency having been automatically established by the memory and sequencing units.

The switch 266 would also preferably be adjustable to a further position 3 where communications could be directly between a patient and a supply and distribution center, for example, and to an additional position 4 where communications could be directly between a "roving nurse" and a patient. In this latter regard, the switch 266 would connect the audio stages with a two-way paging system 280 of the type wherein a nurse carries a wireless transmitter/receiver. In any of the foregoing instances, except for position 1 of switch 266, the master station would automatically adjust itself by means of the memory and sequencing devices so as to return a coded signal for communications operation. Further, as opposed to the hand set 104 receiving the audio signal, the same would originate from or be passed to another audio device, whether it be a hand set at the main switchboard, a hand set at a supply and distribution center, or an audio network for a two-way paging system.

While the use of switch 266 has been described in connection with FIG. 4, it should be apparent that such switch has equal applicability to the master console of FIG. 3.

In the embodiments of the invention discussed specifically above, it was assumed that there was a single coaxial cable used on each floor of a hospital and/or that a given coaxial cable led from a particular console unit to a group of rooms with such console being spaced apart or separated from another console or other consoles. While such an arrangement is advantageous under particular conditions, a modified embodiment of the present invention affords somewhat greater versatility in use from the standpoint of operating personnel.

Figure 5:
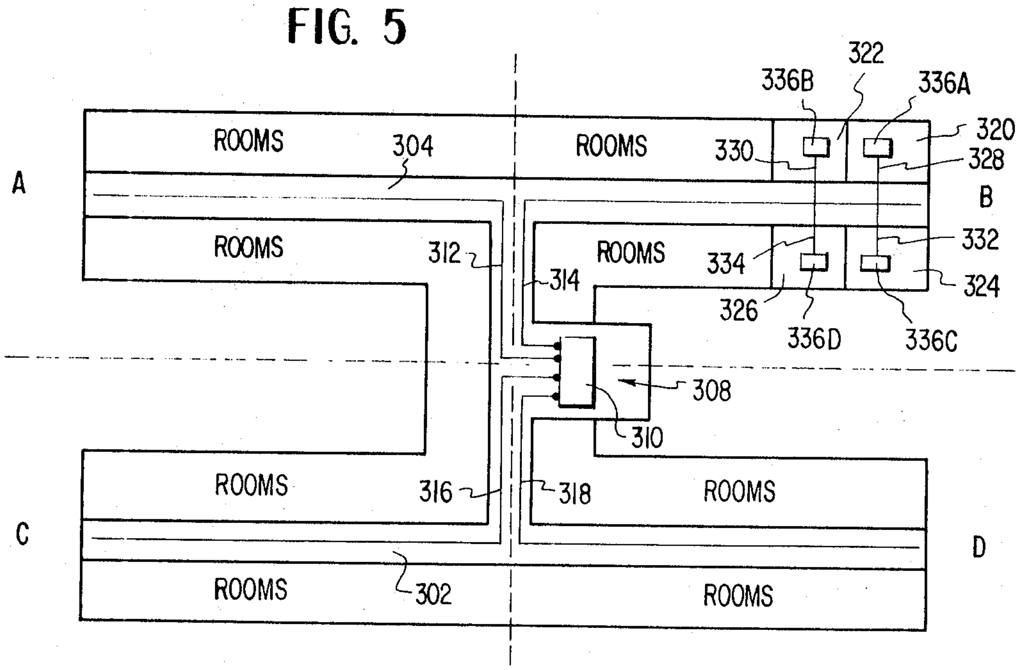
FIG. 5 is a schematic layout diagram of an embodiment of the invention wherein a single administrative control center is used to service a group of patient room sections.

Attention is thus now directed to FIG. 5 wherein a basic modified type layout is presented. The floor or section of the hospital under consideration is generally designated by the numeral 300, and is subdivided (by the dotted lines) into four areas, namely, areas A, B, C, and D. These areas each include part of respective hallways 302 and 304 with a connecting corridor 306. An administrative control center is provided in the offset area 308 which has a console 310 there located. The console 310 feeds a series of four coaxial cables 312, 314, 316, and 318, respectively, which lead down and through the corridors in the respective areas A, B, C, and D. Each such area includes a group of rooms, as indicated, and leads from the respective coaxial cables extend into each room. Thus, the rooms 320, 322, 324, and 326 are shown by way of example in section B with lead-in coaxial cables 328, 330, 332 and 334 extending to the receivers 336A, 336B, 336C, and 336D in each room. For practical purposes, the coaxial cable 314 is the same as the coaxial cable 2, or can be the same, and similarly, the receivers 336A–336D are or can be the same as the receivers 10, 10', etc. of FIG. 1. Alternatively, the receivers are preferably of the type described in more detail hereinafter.

Regardless of the form of the receivers, it has been found desirable to feed the respectively separate coaxial cables 312–316 with TV signals from a common antenna and power from separate power supplies. To this end, reference is made to FIG. 6. Here, an antenna 338 feeds to an amplifier and filter network of conventional design, namely, the network 340, which places RF signals on the common input lead 342. For the coaxial cable 314, the common input lead 342 leads through a power supply section 344 and a coupling filter 346 to the inner wire 348 of the coaxial cable 314 which has its exterior conductor or shield 350 grounded. Power for operation of the receivers coupled with the cable 314 is obtained from the power supply section 344. Such section is fed by an AC source as indicated. The AC signal, as received at the terminals 352, is rectified by the diode 354 and filtered by the filter network 356. The fail-safe battery 358 is incorporated so that the system remains operative in the event of failure of the AC power. The diode 354 and condenser (filter network) 356 are presented schematically. As well known to those of ordinary skill in the art, a diode bank and a condenser bank and/or a resistor condenser network should be used where the load is heavy so that the ratings of particular components are not exceeded. For purposes of understanding the operation of the invention, however, the presentation of diode 354 and condenser 356 is satisfactory and thus further comment thereon is unnecessary.

Just as the power suply section 344 feeds to the coaxial cable 314, the power supply sections 344', 344'' and 344''' feed to the other coaxial cables 312, 316, and 318, and each power supply section is the same as the section 344 described in detail.

Figures 6, 7:
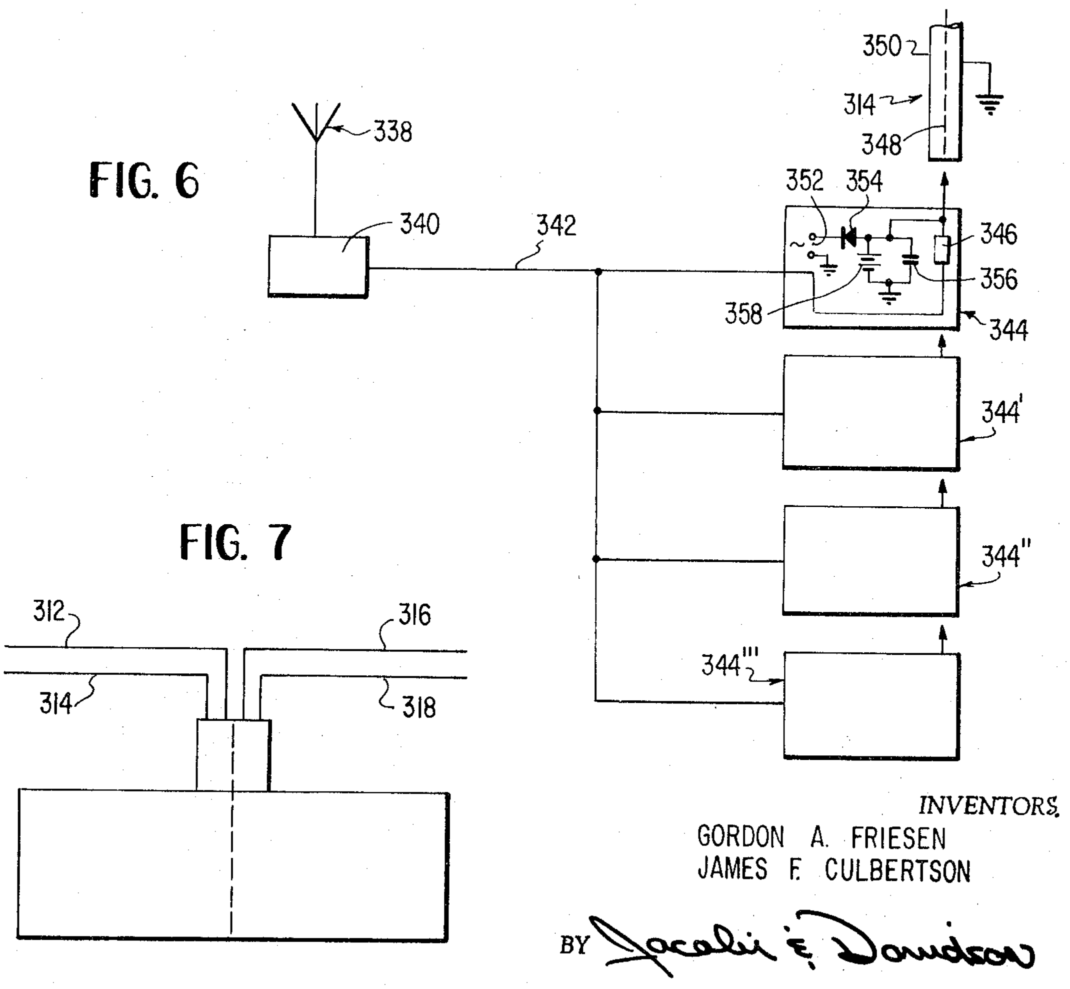
FIG. 6 is a schematic block diagram of a preferred form of antenna and power supply arrangement utilized with a layout such as shown in FIG. 5.
FIG. 7 is a schematic block diagram of the master console unit preferably used in a layout such as shown in FIG. 5.
Figure 8:
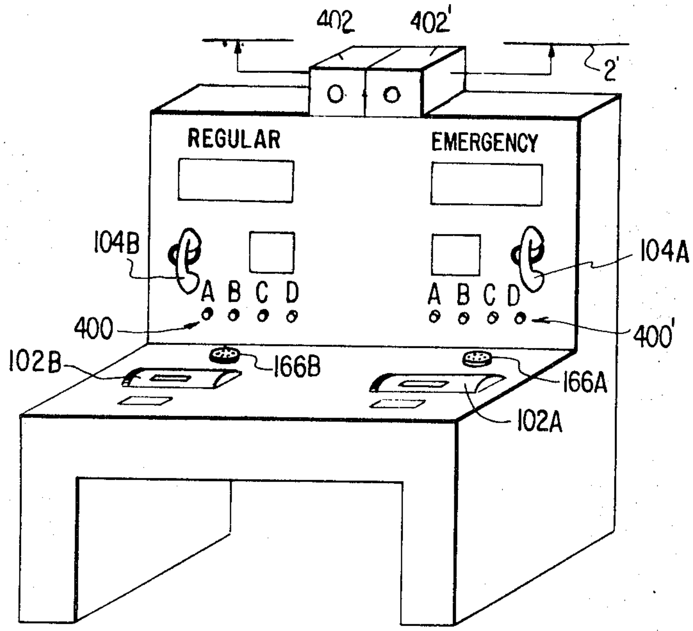
FIG. 8 is a perspective view of a console unit of the type shown in FIG. 7.

With the arrangement shown in FIG. 5, the console 310 can be identical to the consoles described in connection with FIGS. 1, 3 and 4, and the operation thereof can similarly be identical. However, during certain times of the day when the work load for the communication system is particularly heavy, it may be desirable to have more than one communications operator. Thus, a preferred embodiment of the invention contemplates making the console 310 as a double desk type unit which can conveniently seat at least two operators. In FIG. 8, such a unit is shown. This console corresponds with the one shown in FIG. 4 except that the hand set 104' is replaced by two hand sets 104A and 104B, the dial 166' is replaced by two dials 166A and 166B and the selector switch 102' is replaced by two selector switches 102A and 102B. With this arrangement, and as indicated in FIG. 7, one-half of the console can serve one-half of the floor, such as the floor shown in FIG. 5, and the other half of the console can serve the other half of the floor. The operation would be just as explained above, if desired, except that where different frequencies were required for each room, with the arrangement of FIGS. 7 and 8, the same frequencies could be used for different rooms, provided the rooms were on different coaxial cables. Thus, the console includes two additional switches 400 and 400' which serve to permit the operator to link his selector switch and the like with the particular coaxial cable in question, i.e., with any combinations of areas A, B, C, or D, as indicated. Either operator can thus serve the whole floor or two operators can serve different sections as desired.

A further modification shown in FIG. 8 resides in the provision of two TV cameras of conventional design, namely, the cameras 402 and 402'. These cameras feed to the coaxial cables, or in particular, the coaxial cable selected by the operator with adjustment of his switch 400 or 400'. The camera, as customary, has a picture signal frequency modulated on a particular carrier and the carrier is so selected that it does not interfere with other carriers used in the system or the carriers associated with the entertainment channels in the particular locale.

Figure 9:
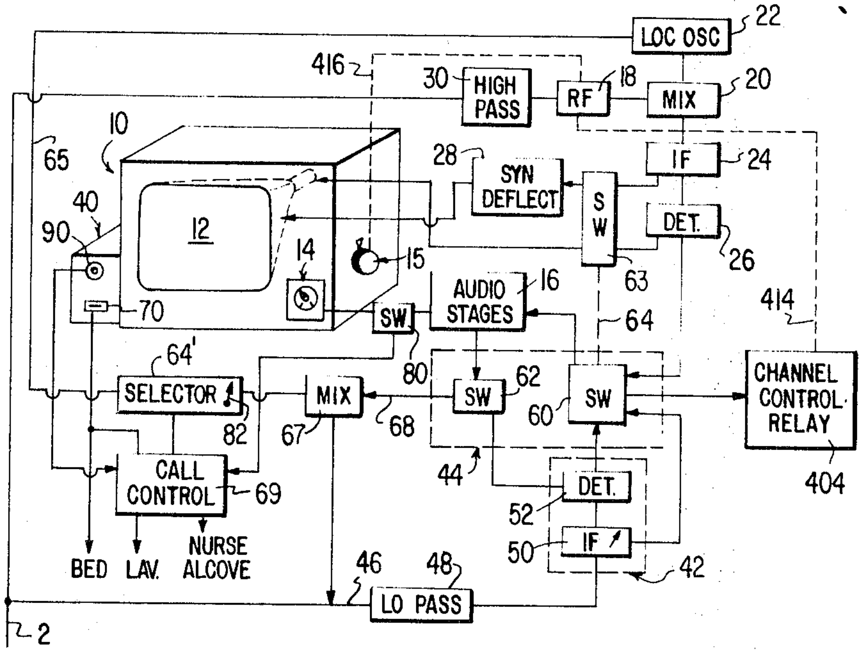
FIG. 9 is a schematic block diagram of a receiving station constructed in accordance with a modified embodiment hereof wherein video information is delievered to the patient from a centralized location.
Figure 10:
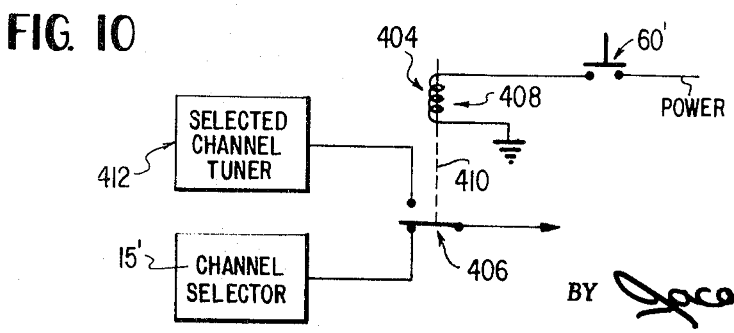
FIG. 10 is a fragmental schematic block diagram of a portion of the tuning control arrangement used with the receiver station of FIG. 9.

Accordingly, when the operator adjusts the switch 400, for example, the camera 402 which is focused on that operator, delivers a picture signal and carrier to the coaxial cable for the selected area. In this instance, the carrier and picture or video signal can conveniently be received by a given patient, if the particular patient's receiver or TV set has basically the same arrangement as shown in FIG. 2, but additionally includes the modification shown in FIGS. 9 and 10. In FIG. 9, the TV set 10 is shown as having a channel selector knob 15 on one side thereof. Further, a channel control relay means 404 is shown as being connected with the switch 60. The basic operation of the arrangement of FIG. 9 is the same as explained in connection with FIG. 2. However, when the switch 60, upon receipt of a signal from the administrative control center or console, connects the speaker 14 in the circuit with the audio signal being delivered from the console, it simultaneously activates the channel control relay 404. This relay, as shown in FIG. 10, can, by way of example, include a coil 408 mechanically linked as by the mechanical link 410 with a switch 406. The switch 406 is placed in the output connection from the conventional channel selector mechanism 15', which channel selector mechanism is normally operated by the channel selector knob 15. For this embodiment, however, one particular channel normally selectable by the channel selector is disconnected, not used, and/or left off of the set. In its place, a selected channel tuner network 412 is provided. This selected channel tuner network receives the incoming signals in the same manner that the conventional channel selector networks 15' would receive such signals.

When the coded signal from the console is received by the particular patient's set such that it would operate the switch 60 to link the audio stages 16 with the detector 52, there is a simultaneous operation of the relay 404 caused by the switch 60. As shown in FIG. 10, the switch 60 would include an additional switching element, schematically designated as 60', which would energize the relay 404, thereby shifting the switch element 406 thereof into the position where it connects the selected channel tuner 412 as the effective tuning component. In other words, when the patient is to receive a signal from the master console, the switch 60, through the channel control relay, essentially "switches out" the conventional channel selector, and in its place, "switches in" the selected channel tuner. This means that the video portion of the set is tuned to a given channel, and this channel is the one corresponding to the carrier frequency on which the video signal from the console is modulated.

It will thus be understood from the foregoing and from a review of FIGS. 9 and 10, that where a television camera is used at the console or administrative control center, the patients' receivers in the respective rooms and/or at the respective beds can be modified to include means for tuning the television set to a particular channel corresponding to the channel having the video information from the administrative control center. It might be noted that in FIG. 9, mechanical links 414 and 416 are shown. Mechanical link 416 is presented because the channel selector, as well known to those skilled in the art, actually effects operation of the RF section 18 to achieve the desired tuning. Similarly, the channel control relay 404 is effective in cooperation with the RF section 18, as indicated by FIG. 10, to yield a video output on the channel being used to transfer the video information within the hospital, i.e., from the administrative control center to the particular patient.

Except as indicated above, the operation and overall arrangement of the system used in connection with the embodiments of FIGS. 9 and 10 would be the same as with respect to other figures described previously. Thus, detailed attention has not again been directed to individual components or individual facets of the overall operation, and instead, only the modified operations and modified circuit arrangements have been considered.

A further alternative which can be utilized when a video signal is to be transferred from the admistrative control center or console to the patient is schematically presented in FIG. 11. Here, the switch 60 and control relay 404 work in the same manner as described in connection with FIG. 9. However, the switch 60 is not utilized to connect the audio stages 16 with a detector 52 as in prior embodiments. Instead, in the embodiment of FIG. 11, the detector 52 is eliminated. The coding signal, as detected by the IF stage 50 operates the switch 60 solely for the purpose of controlling the channel control relay 404. Once this relay is energized, and the selected channel tuner 412 of FIG. 10 is effective to tune the television set to the channel on which the information is coming from the administrative control center, then the set is ready for operation. With this embodiment, the audio signal from the administrative control center is modulated on the same carrier as the video signal, and essentially a conventional television signal with both audio and video portions is fed to the receiver. The receiver is tuned to the channel for such information, and thus insofar as receipt of information from the administrative control center is concerned, the operation is the same as that of the conventional television receiver.

Similarly, for the patient to initiate a call and/or to receive a call, the operation is similar, except for the elimination of the detector 52, as explained. However, a sensor 420 is incorporated. This sensor is used for essentially one of the purposes for which the detector 52 was previously used. More particularly, the sensor 420 determines when an audio signal is passing through the audio stages from the administrative control center, and operates the switch 62 accordingly. It will be recalled that the switch 62 in the embodiment of FIG. 2 was controlled by the detector 52 such that the switch 62 only connected the audio stages 16 with the mixer 67 when there was no audio signal being received from the console or administrative control center. In like manner, the sensing network 420 serves the same purpose, but the sensing network 420 derives its signal directly from the audio stages rather than from the IF stage 50.

With respect to FIGS. 9, 10 and 11, it will now be understood that in either of the embodiments explained immediately above, there is essentially a "channel change" on the TV set. In one instance, the channel change results in the TV set components already available handling both the video and audio signals, whereas in the other embodiment, the audio components are handled separately. Yet, the operation is equally effective in either instance. With respect to modulation of the audio signals from the console onto the carrier with the video signal from the console, it will be immediately appreciated that standard equipment can be incorporated. Just as voice and video signals are modulated on a carrier with conventional TV camera and microphone equipment, the same techniques and components can be used for purposes of effecting a basic signal with video and audio portions at the console.

The system with intrahospital video display also lends itself to use for a patient that is to be maintained in isolation and yet would like to see his friends or relatives. More particularly, with the described arrangement, a TV camera can be placed in a visitor's room and a similar TV camera can be placed in the patient's room. An audio link between the rooms is conveniently established through the coaxial cable arangement, and if a particular channel is selected for so-called "visitation" purposes, then the patient can visit by remote control with his friends or relatives through the mere use of "plug-in" type devices. In addition to the embodiments of the basic system, and the variations discussed which can be achieved therewith, the system hereof further contemplates the possibility of using the patient's TV set as a means for transmitting information from a privacy station, such as a nursing alcove in the patient's room, the administrative control center or console, within disturbing the patient. In this regard, attention is directed to FIGS. 12 and 13.

FIG. 13 shows the components which would be included at a nursing alcove, namely, a handset such as a telephone handset 500, an audio amplifier 502, a switching means 504, a tone generator 506 and a high pass filter 508. The high pass filter serves to isolate the cable means 2 inside the patient's room and prevents audio frequency signals from entering other parts of the overall communications system outside the room. The network of FIG. 12 corresponds to the network of FIG. 1, but additionally includes a generating means 510, a connection 512 between call control 69 and switch 62, a connection 514 between call control 69 and locking means 516 and a tone actuated switch 518.

In operation, if the nurse or doctor, for example, wish to communicate with the administrative control center or console on a private basis, they would go to the nursing alcove. The switch 504 would then be depressed which would cause the tone generator 506 to emit a distinctive tone signal at an audio frequency. This tone would go through cable means 2, connected as shown in FIG. 13 to tone switch 518 in the patient's TV. This tone switch 518 would be a conventional reed relay switch which when activated by the tone from the nursing alcove would cause a switching operation in call control 69. This would result in the generator 510 producing a signal which is fed via the connection 512 to switch 62 and via the connection 514 to the locking means 516. The locking means 516 would essentially lock the patient's call button in "off" position. Such locking means could be mechanical in nature as indicated in FIG. 12, or if desired, the locking means can take the form of a switch which disconnects the lavatory bed and button 19 from the call control unit so that the patient could not initiate a call. The signal from the generator 510 would feed through the call control 69 to the switch 62 for purposes of connecting the incoming audio signal from the amplifier 502 to the mixer 68, and for purposes of simultaneously feeding thereto the signal from the generator 510. In this way, the patient's television set would operate in its normal manner, but the doctor or nurse, used in this example, could talk with the administrative control center by virtue of the operation of the switch 62, mixer 67, and the like, in the same manner that the patient would normally talk to the administrative control center. Similarly, the doctor or nurse could receive information from the administrative control center, just as the patient would normally receive such information, with the difference being that the doctor or nurse would be using the hand set 500 rather than the television speaker.

The generator 510 has been incorporated because the signal therefrom is used for purposes of mixing with the signal from the local oscillator in the mixer 67 to thereby produce a distinctive frequency which, when fed to the administrative control center or console, would serve to activate a particular light or the like. For simplicity purposes, the console can be considered as having a few extra lights for a few extra rooms, and these lights for these rooms, and the switching components to be associated therewith, would be of like nature to those described above. However, the extra lights would connect with one or more nursing alcoves. For convenience, it would probably be sufficient to have three or four extra switch positions and three or four extra lights on the console for a twenty-patient section whereby an attendant at the console could answer any one of a group of nursing alcoves without individually answering any given nursing alcove.

To permit information transfer between an administrative control center and a privacy station with a minimum of extra components and still utilizing the same basic network is obviously quite advantageous. Accordingly, the arrangement discussed in connection with FIGS. 12 and 13 is preferably incorporated in any system made in accordance with the invention. It will be apparent that the modifications involved are readily adapted to the basic system of FIG. 2 as well as to the modified systems of FIGS. 9 and 11.

In the foregoing embodiments of the present invention, it has been assumed that a frequency code was used for purposes of selectively establishing communication between respective stations. However, it has been indicated that a pulse control system could be used, and to this end, attention is now directed to FIGS. 14 and 15.

FIG. 14 corresponds essentially identically with FIG. 11, except for the fact that a pulse decode means 700 has been substituted for the frequency selective means 42 of the system of FIG. 11. The pulse decoder 700 is of conventional design, and is adapted, according to the particular set, to produce an output only upon receipt of a given pulse code. For exemplary purposes, let it be assumed that the pulse decoder 700 shown in FIG. 14 is sensitive only, for example, to the pulse change shown on line 1 of FIG. 15. If the pulse code is placed on the coaxial cable, then and in that event only, will the pulse decoder 700 produce an output which will then operate the switch 60 in the manner previously described. Thus, the arrangement of FIG. 14 operates the same as the arrangement of FIG. 11 in that it converts the set so that it receives a particular channel on which the video and audio signals from the administrative control center are placed. Other sets would include pulse decode networks similar to the pulse decode means 700, but responsive to a different code. A further modification of the overall system in connection with FIG. 14 requires that the signal source 115 and signal select means 117 of FIG. 3 be replaced with a selective pulse generator adapted to produce a pulse code, and that the incoming signal decoder 119 of FIG. 3 be responsive to pulses rather than frequencies. Similar frequency to pulse conversion would be required in other components, but detailed discussion of this conversion seems unnecessary since the components employed would be of conventional design, although connected in a particular combination. Rather than repeat the explanation of the operation in connection with FIG. 3 and also in connection with FIG. 11, suffice it to say that with respect to FIG. 14, a call is received in the same manner but the particular pulse sequence, pulse shape, or pulse timing controls the selected station rather than the particular carrier frequency. Similarly, the selector 64'' is so designed as to result in the production of a distinctive pulse output from the mixer 67, which distinctive pulse output is received at the console to identify the particular calling station.

If desired, the incoming signal decoder 119 of FIG. 3 can incorporate automatic pulse generating means for returning to the particular calling station a distinctive pulse change indicating that the call has been received at the console, although not yet answered. This return coded pulse change would be detected by the auxiliary pulse detection means 702, which auxiliary pulse detection means would in turn produce an output fed over the line 704 to energize a lamp 706. With energization of the lamp, the patient would immediately know that his call had been received at the central station and that he was awaiting his turn.

The advantages of using a pulse code over a frequency code are numerous. Merely by way of example, a basic code can be used for each set with a further pulse chain being provided to establish emergency conditions. Consider again FIG. 15. Assume that the pulse chain on line 1 is the pulse chain to which the pulse decoder 700 of FIG. 14 is responsive. In other words, the pulses on line 1 represent the pulse code for the particular receiver shown in FIG. 14. Further assume that the pulse code on line 2 represents an emergency pulse code. If the selector 64'' is adjusted to produce an output of pulses corresponding first to the pulses on line 1 and then to the pulses on line 2, then with a series of, for example, four pulses from line 1 followed by a series of four pulses as shown on line 2, there would be two pulse codes delivered to the central station. The first pulse code would identify the particular location calling, and the second pulse code in the same chain could, for example, indicate an emergency condition.

By using pulse codes, therefore, various different information factors can be easily transferred from station to station while still using but the simplest of equipment.

With respect to FIG. 14 and other figures wherein a video signal was delivered to the patient, it is helpful to note that the switch 63 retains its intended operation. Specifically, if the television set is on at the time that the administrative control center returns a call or makes a call, then the video portion of the information transferred from the administrative control center appears on the television set. However, if the television set is off, then the patient only receives the audio portion since the video portion is prevented from being displayed by the "off" condition of the switch 63.

Although not specifically described above in connection with any figure, it should be understood that, if desired, a display control board can be incorporated in suitable position along any corridor to indicate what patients have initiated calls to the administrative control center. For example, in parallel with the lamp banks 106 and 108 of FIG. 3, there can be connected a display board in each corridor, which display board is easily visible by any nurse or attendant. The display board would assume the same characteristics as the display panel shown in FIG. 3, but it would not have all the transmitting and receiving components associated therewith. Instead, it would indicate to a nurse or the like which room was attempting to initiate a call and/or demanding information. Similarly, such display board could have sections thereon for calling a particular nurse, doctor, or the like by a number code, for example.

There are, of course, various additional modifications which could be made to the system aside from the use of automated memories, switchboard type monitor information transfer pulse coding rather than frequency coding, and the like. However, the embodiments discussed above should clearly demonstrate the widespread versatility of the basic type arrangement provided by the invention. When such versatility is coupled with the simplicity of over-all operation, the need for only a dual conductor cable and the use of the basic television set and its available components, it becomes aparent that the objects set forth at the outset of this specification have been successfully achieved. Accordingly,

What is claimed is:

1. A communications system comprising in combination:

(A) a supply section including:
- (a) connection cable means having a pair of electrically conductive elements;
- (b) means for supplying DC power to said connection cable means;
- (c) means for supplying television signals to said connection cable means;

(B) a plurality of remote stations each including:
- (a) television receiver means operable with said DC power to present in a first mode of operation both visual and audio information in response to said television signals, said television receiver means having selectively operable means for controlling the information presented thereby;
- (b) means responsive to a predetermined coded signal on said cable means for activating said selectively operable means to convert said television receiver means from said first mode of operation to a second mode of operation in which said television receiver means presents command information; and
- (c) means for receiving command information signals from said connection cable means and feeding command signal information to said television receiver means;

(C) a master station including:
- (a) code signal generating means for producing any one of a plurality of predetermined code signals and delivering the same to said connection cable means; and
- (b) means for supplying command signals to said connection cable means as command signals.

2. The communication system defined in claim 1 wherein said selectively operable means for controlling the information presented by said television receiver means comprises tuning means, and wherein said means responsive to a predetermined coded signal comprises switching means for changing said tuning means to be responsive to a predetermined television signal channel.

3. The communication system defined in claim 1 wherein each of said remote stations includes means for generating an independent distinctive signal, means for delivering said independent distinctive signal to said connection cable means, and means for delivering an audio signal to said cable means with said distinctive independent signal.

4. The combination defined in claim 3 wherein said means for generating said independent distinctive signal and both of said delivering means are operable independently of operation of said television receiver means, and wherein said system further includes auxiliary sending and receiving means at a location remote from said television receiver means and operably coupled to said generating means and delivering means to permit private communication between said auxiliary sending and receiving means and said master station.

5. In combination with a television receiver means having audio and video producing means and a channel selector for tuning said television receiver to any one of a plurality of television channels to receive and display selected audio and video information, the improvement comprising:
- (a) means operatively connected with said receiver and responsive to predetermined coded signals for producing a control output;
- (b) means responsive to said control output for operating said television receiver means to reproducing audio information received from a predetermined remote location regardless of the operating condition of said television receiver means at the time said control signal occurs; and
- (c) means for generating a predetermined coded output signal at said television receiver means.

6. The combination defined in claim 5 wherein said means responsive to said control output includes means for operating said television receiver means to receive a given television channel and reproduce video information from signals in such channel, and means operatively connected to the audio reproducing means of said television receiver means for reproducing audio signals fed to said receiver separate from information on any of said channels.

7. The combination defined in claim 5 wherein said means responsive to said control output includes means for operating said television receiver means to tune the same to a predetermined channel.

8. The combination defined in claim 5 wherein said means for generating a predetermined coded output comprises signal developing means and an audio signal network, and wherein said audio signal network includes means for selectively controlling the output thereof in response to the transmission of signals therethrough.

9. The combination defined in claim 5 wherein said coded signals are signals with coded frequencies.

10. The combination defined in claim 5 wherein said coded signals are coded pulse trains.

11. A communication system comprising in combination:

(A) a supply section including:
  (a) electrical connection cable means;
  (b) means for supplying television signals to said electrical connection cable means;
(B) a plurality of remote stations each including:
  (a) television receiver means operable to present in a first mode of operation both visual and audio information in response to said television signals, said television receiver means having selectively operable means associated therewith for controlling the information presented thereby; and
  (b) means associated with said television receiver means and responsive to a predetermined signal on said cable means for activating said selectively operable means to convert said television receiver means from said first mode of operation to another mode of operation in which said television receiver means presents command information;
(C) a master station including:
  (a) means for generating any one of a plurality of said predetermined signals and for delivering the same to said electrical connection cable means; and
  (b) means for supplying command information to said electrical connection cable means.

12. A communications system comprising in combination:

(A) a supply section including:
  (a) connection cable means having a pair of electrically conductive elements;
  (b) means for supplying television signals to said connection cable means;
(B) a plurality of remote stations each including:
  (a) television receiver means operable to present in a first mode of operation both visual and audio information in response to said television signals, said television receiver means having selectively operable means for controlling the information presented thereby;
  (b) means responsive to a predetermined coded signal on said cable means for activating said selectively operable means to convert said television receiver means from said first mode of operation to a second mode of operation in which said television receiver means presents command information; and
  (c) means for receiving command information signals from said connection cable means and feeding command signal information to said television receiver means;
(C) a master station including:
  (a) code signal generating means for producing any one of a plurality of predetermined code signals and delivering the same to said connection cable means; and
  (b) means for supplying command signals to said connection cable means as command signals.

References Cited

UNITED STATES PATENTS

| | | | |
|---|---|---|---|
| 2,978,538 | 4/1961 | Breese | 178—5.6 XR |
| 3,105,873 | 10/1963 | Winston et al. | |
| 3,215,774 | 11/1965 | Ikegami. | |
| 3,423,521 | 1/1969 | Friesen et al. | |

ROBERT L. GRIFFIN, Primary Examiner

R. L. RICHARDSON, Assistant Examiner

U.S. Cl. X.R.

340—310; 178—6